US008272501B1

(12) United States Patent
Curcuri et al.

(10) Patent No.: US 8,272,501 B1
(45) Date of Patent: Sep. 25, 2012

(54) PNEUMATIC POWDER FEEDER SYSTEM FOR MUNICIPAL SEWER LIFT STATION

(76) Inventors: Thomas J. Curcuri, Grosse Pointe Woods, MI (US); Jack T. Curcuri, Shelby Township, Macomb County, MI (US)

( * ) Notice: Subject to any disclaimer, the term of this patent is extended or adjusted under 35 U.S.C. 154(b) by 193 days.

(21) Appl. No.: 12/657,326

(22) Filed: Jan. 19, 2010

Related U.S. Application Data

(60) Provisional application No. 61/212,846, filed on Apr. 16, 2009.

(51) Int. Cl.
*B65G 33/34* (2006.01)

(52) U.S. Cl. .................. 198/674; 198/671; 134/221.12; 222/413

(58) Field of Classification Search .................. 406/58; 198/657, 671, 674; 134/22.11; 222/413
See application file for complete search history.

(56) References Cited

U.S. PATENT DOCUMENTS

| | | | | |
|---|---|---|---|---|
| 2,129,252 A * | 9/1938 | Whiteside | .................. | 406/58 |
| 2,324,042 A * | 7/1943 | Swenson | .................. | 406/58 |
| 2,343,714 A * | 3/1944 | Swenson | .................. | 406/101 |
| 2,542,476 A * | 2/1951 | Carlson | .................. | 406/58 |
| 2,760,298 A * | 8/1956 | Trier | .................. | 222/160 |
| 3,589,313 A * | 6/1971 | Smith et al. | .................. | 110/222 |
| 3,861,599 A * | 1/1975 | Waggoner | .................. | 239/654 |
| 4,036,754 A * | 7/1977 | Peasley | .................. | 210/139 |
| 4,363,572 A * | 12/1982 | Harvey | .................. | 406/58 |
| 4,475,819 A * | 10/1984 | Balmer | .................. | 366/107 |
| 4,940,010 A * | 7/1990 | Kubin et al. | .................. | 110/233 |
| 5,252,290 A * | 10/1993 | Uesugi | .................. | 422/22 |
| 5,443,845 A | 8/1995 | Felix | | |
| 5,570,743 A * | 11/1996 | Padgett et al. | .................. | 166/285 |
| 5,622,571 A * | 4/1997 | Derlein | .................. | 134/22.11 |
| 5,626,684 A * | 5/1997 | Rodarte et al. | .................. | 134/22.12 |
| 5,725,885 A | 3/1998 | Felix et al. | | |
| 5,954,868 A | 9/1999 | Felix et al. | | |
| 6,277,279 B1 * | 8/2001 | Hruza | .................. | 210/610 |
| 7,080,960 B2 * | 7/2006 | Burnett | .................. | 406/11 |

FOREIGN PATENT DOCUMENTS

EP 0809612 B1 1/2000

OTHER PUBLICATIONS

BiNutrix (registered TM) Waste Water Treatment System two page fact sheet of BioNutraTech, Inc. of Shell Knob, MO 65747. Date unknown, but at least as early as Jan. 1, 2009.

* cited by examiner

*Primary Examiner* — Joseph A Dillon, Jr.

(57) ABSTRACT

A pneumatically driven powder feeder system which is partly disposed within a municipal sewer for the purpose of providing periodic dispersal of wastewater treatment powder. A pneumatic source apparatus is disposed outside the sewer and provides a pneumatic source regulated by a solenoid valve control system. A pneumatically driven powder feeder apparatus is disposed in the sewer and is connected to the pneumatic source by a feed line. In response to periodic delivery of the pneumatic source to the pneumatically driven powder feeder apparatus, the powder is delivered to the wastewater of the sewer.

2 Claims, 6 Drawing Sheets

PNEUMATIC POWDER FEEDER SYSTEM FOR MUNICIPAL SEWER LIFT STATION

CROSS-REFERENCE TO RELATED APPLICATIONS

The present patent application claims the benefit of U.S. Provisional Patent Application Ser. No. 61/212,846, filed on Apr. 16, 2009.

TECHNICAL FIELD

The present invention relates to municipal sewers and more particularly to feeder systems for delivering treatment powder to sewers. More particularly, the present invention relates to a powder delivery system in which the powder feeder component disposed within the sewer is pneumatically driven.

BACKGROUND OF THE INVENTION

Wastewater treatment systems are well known. For example, BioNutraTech, Inc. of Shell Knob, Mo. 65747 provides a powder for treating wastewater in municipal sewer systems under the trademark name "BiNurtix®", and covered under one or more of U.S. Pat. Nos. 5,443,845, 5,725,885, and 5,954,868, and European Patent Publication 0 809 612. In this treatment system, the powder may be particles of microbial available nutrients having an encapsulation including, for example, oleic acid. The powder when deposited into wastewater of a municipal sewer gradually releases to promote the growth of petroleum degrading bacteria to aid bioremediation of the wastewater.

Problematically, the powder feeder must be disposed within the municipal sewer. Electrically operated powder feeders run the risk of fire or explosion due to sparking in the presence of methane gas within municipal sewers.

What remains needed in the art, therefore, is a non-electrical powder feeder for placement within the municipal sewer.

SUMMARY OF THE INVENTION

The present invention is a pneumatically driven powder feeder system which is partly disposed outside a municipal sewer and partly disposed within the sewer for the purpose of providing periodic dispersal of wastewater treatment powder, as for example BiNurtix® powder.

The pneumatic powder feeder system according to the present invention has two components: an electrically operated pneumatic source apparatus, and a pneumatically driven powder feeder apparatus.

The electrically operated pneumatic source apparatus is disposed outside the municipal sewer and utilizes an electric air compressor to provide pressurized air, referred to herein as the "pneumatic source", and a solenoid valve control system to regulate delivery of the pneumatic source to a pneumatic feed line. At the other end of the pneumatic feed line is the pneumatically driven powder feeder apparatus.

The pneumatically driven powder feeder apparatus is disposed inside the municipal sewer and includes a pneumatic rotational motion device which is periodically driven by the pneumatic source via the pneumatic feed line and the solenoid valve control system, wherein the pneumatic rotational motion device drives a powder distribution mechanism at the bottom of a hopper initially filled with the powder so as to periodically deliver the powder to the wastewater of the municipal sewer.

Accordingly, it is an object of the present invention to provide a non-electrical powder feeder for placement within the municipal sewer.

This and additional objects, features and advantages of the present invention will become clearer from the following specification of a preferred embodiment.

DESCRIPTION OF THE PREFERRED EMBODIMENT

Figure 1:
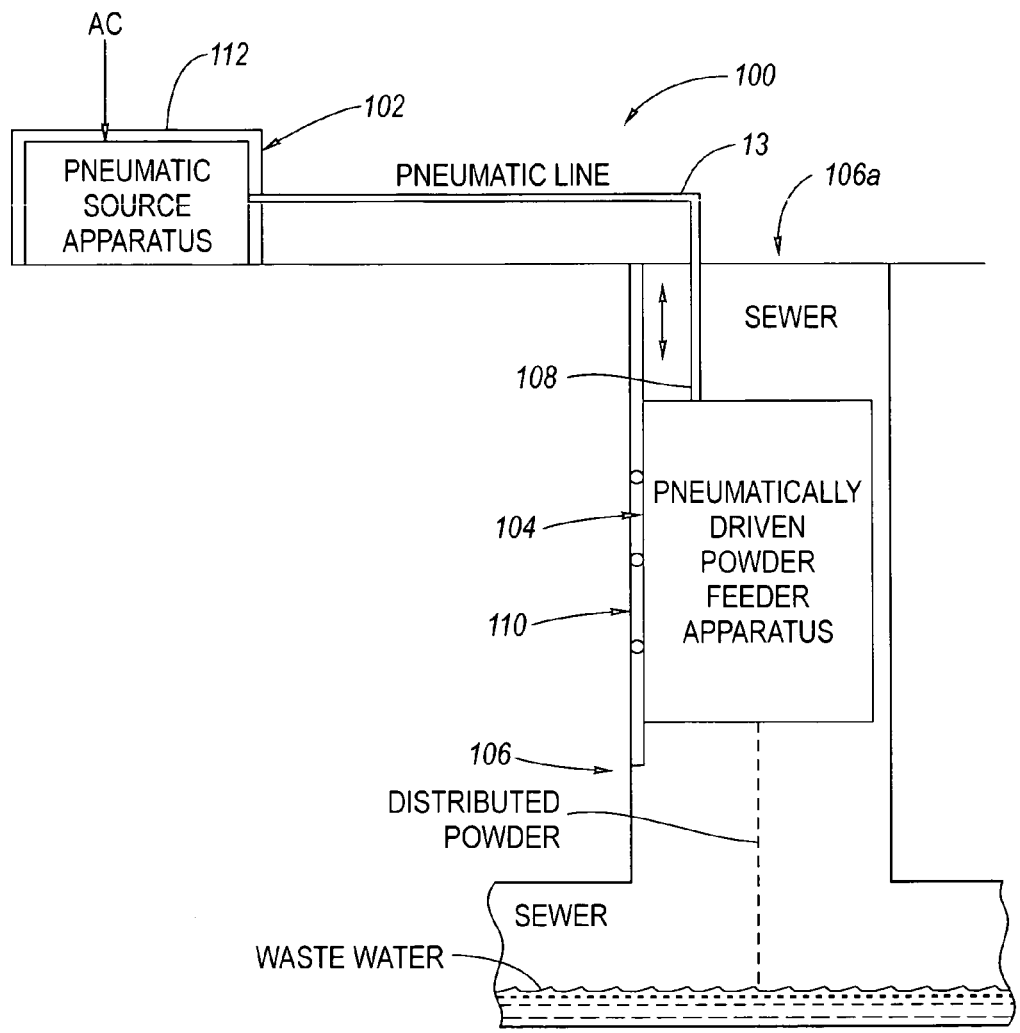
FIG. 1 is a schematic representation of the pneumatic powder feeder system according to a preferred embodiment of the present invention.

Referring now to the Drawing, FIGS. 1 through 7 depict various aspects of an example of a pneumatic powder feeder system 100 according to the present invention.

As shown at FIG. 1, the pneumatic powder feeder system 100 provides periodic dispersal of wastewater treatment powder, as for example BiNurtix® powder, wherein the pneumatic powder feeder system has two components: an electrically operated pneumatic source apparatus 102, and a pneumatically driven powder feeder apparatus 104.

Figure 2:
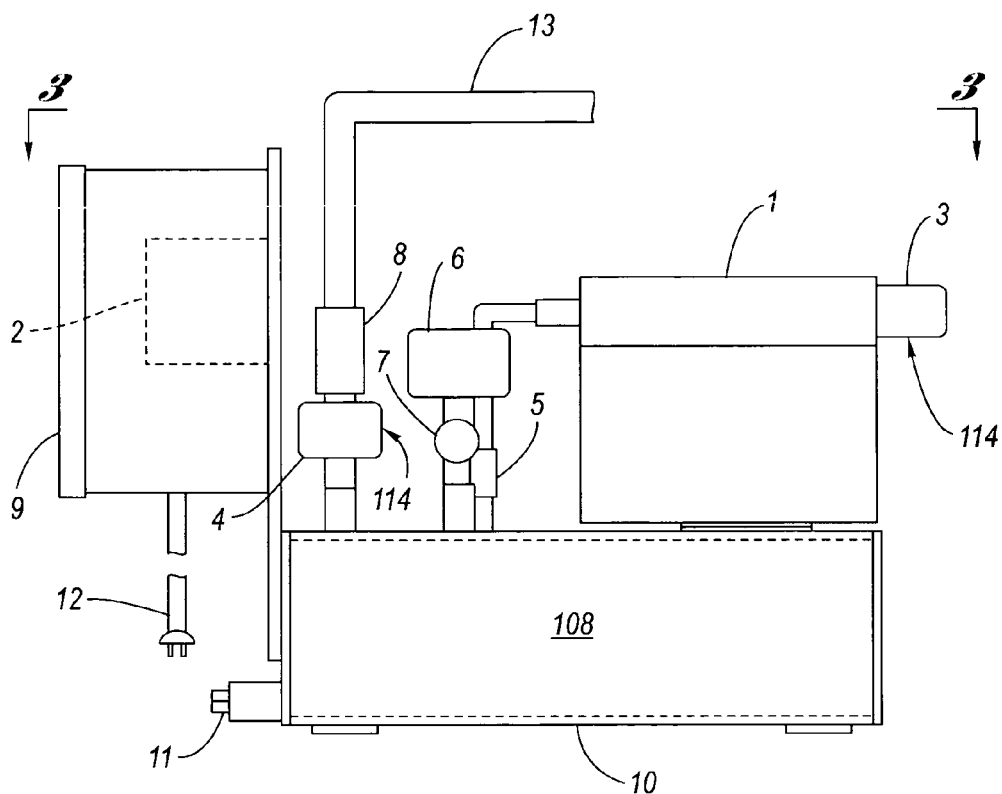
FIG. 2 is a side view of the pneumatic source apparatus disposed outside a sewer according to a preferred form of the present invention in which a pneumatic source is provided electrically.
Figure 3:
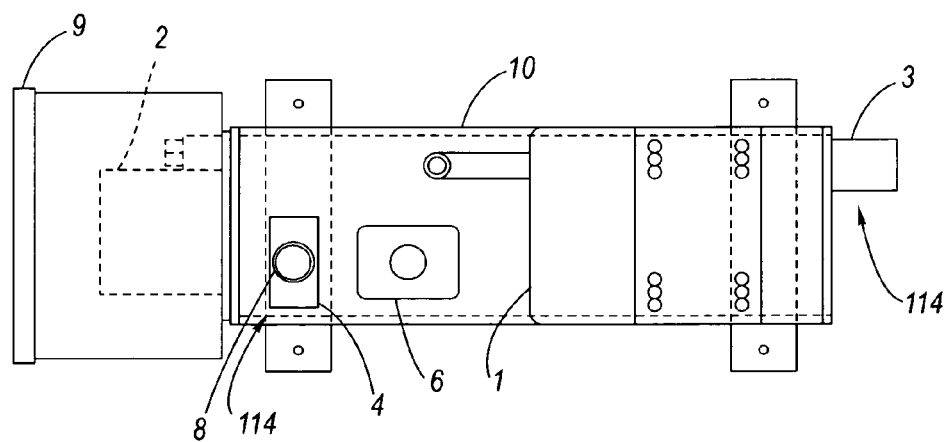
FIG. 3 is a top plan view, seen along line 3-3 of FIG. 2.
Figure 4:
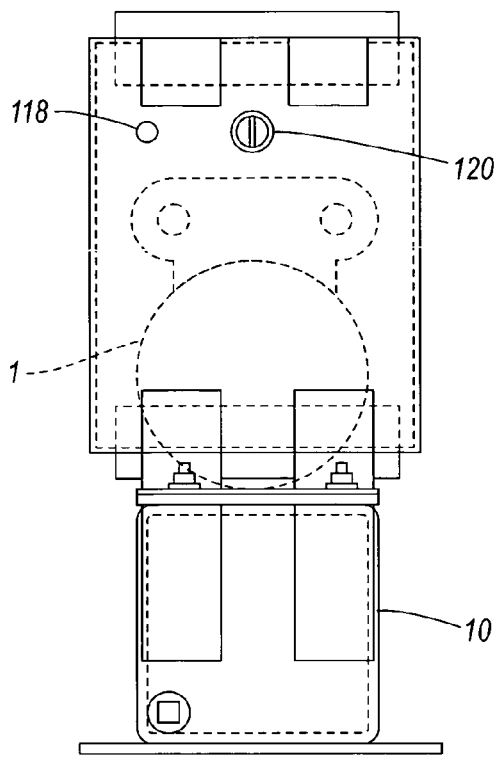
FIG. 4 is a front view seen along arrow 4 of FIG. 2.

As shown additionally at FIGS. 2 through 4, the electrically operated pneumatic source apparatus 102 is disposed outside the municipal sewer 106. An A.C. electrical power source provides electrical energy via a power cord 12 to an electrical enclosure 9 including a seven day electronic timer 2. An electrical air compressor 1 provides compressed air to an air tank 10 which holds the compressed air (the pneumatic source 108). A solenoid control system 114 includes a solenoid control valve 3 and a solenoid bleeder valve 4, which are also operated by the electrical power. Also included in the air lines are a pressure reliever 5, a pressure switch 6, a safety valve 7 and a pressure gauge 8. A clean out 11 is also provided. A "power on" light 118 illuminates when a power switch 120 is turned on.

Figure 5:
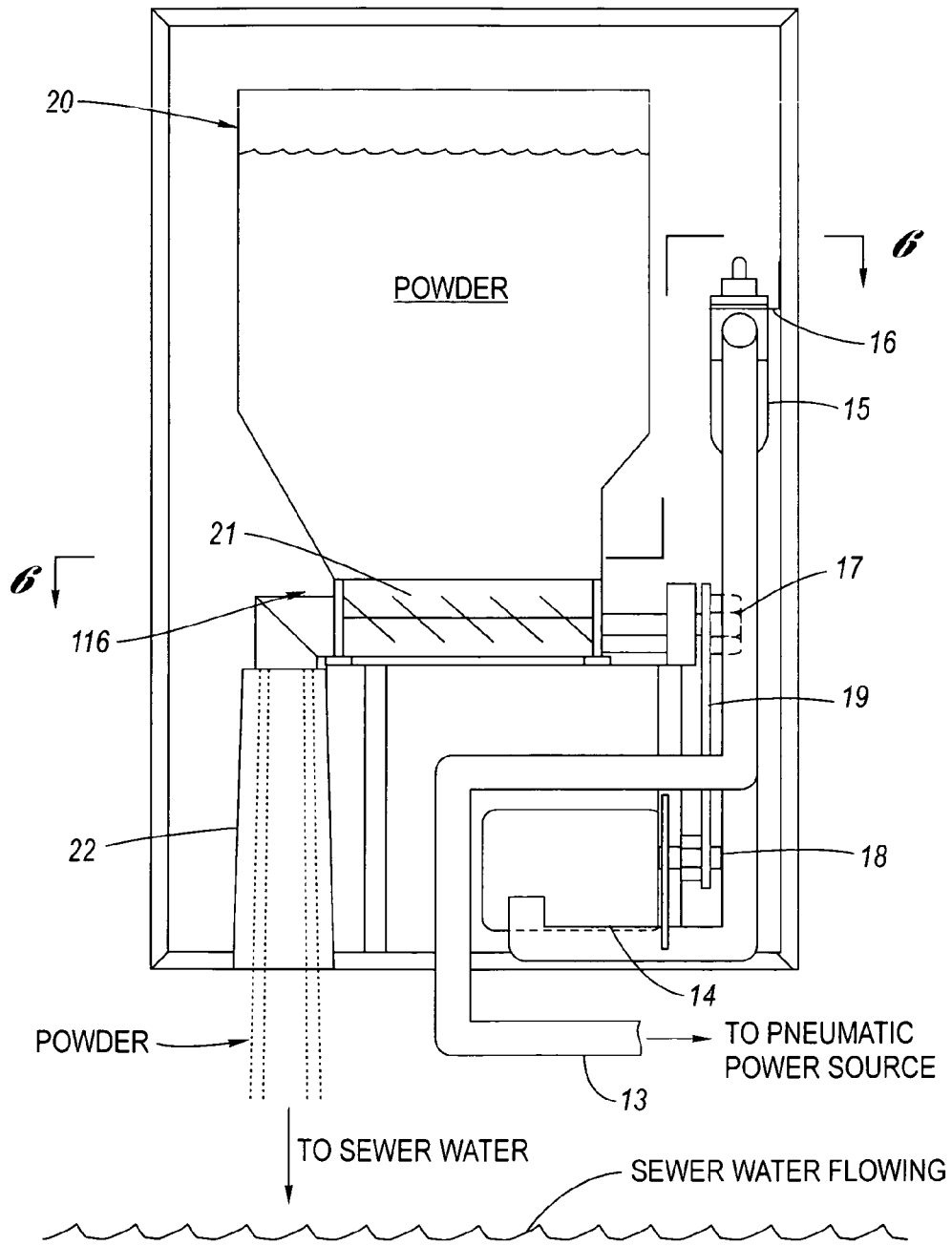
FIG. 5 is a side view of the pneumatically driven powder feeder apparatus disposed inside the sewer according to a preferred form of the present invention in which powder is distributed to treatment water within a municipal sewer.

A pneumatic feed line 13 extends, as for non-limiting example about 20 feet, between the pneumatic source apparatus 102, by a line connection to the solenoid control valve 4 to the pneumatically driven powder feeder apparatus 104, by a line connection to a pneumatic rotational motion device 14 (see FIG. 5).

Figure 7:
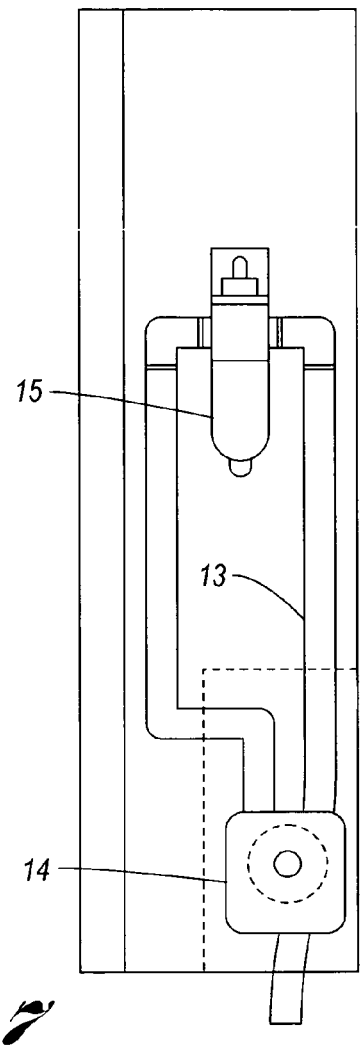
FIG. 7 is a front view seen along arrow 7 of FIG. 5.
Figure 6:
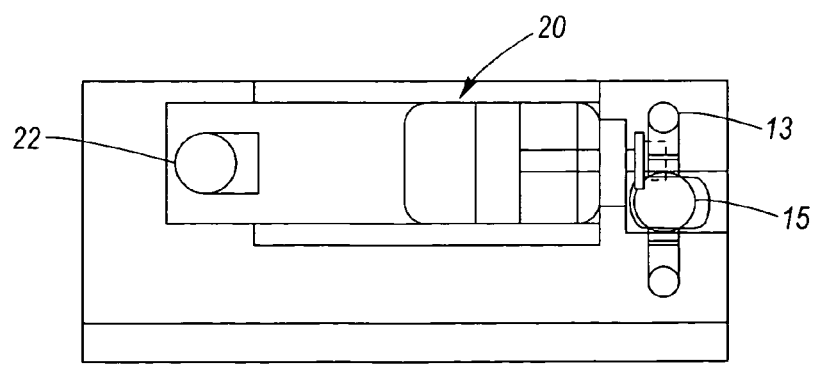
FIG. 6 is a top plan view, seen along line 6-6 of FIG. 5.

As shown additionally at FIGS. 5 through 7, the pneumatically driven powder feeder apparatus 104 is disposed inside the municipal sewer 106. The pneumatic feed line 13 connects to a lubricator 15 attached to a bracket 16 and then connects to the pneumatic rotational motion device 14 (i.e., a pneumatic motor, ratchet or other pneumatically driven mechanism to convert air pressure into rotational motion). The pneumatic rotational motion device 14 is connected to a drive sprocket 18 which is connected drivingly to a driven sprocket 17 via a chain loop 19. The driven sprocket 17 is connected to an auger 21 which is disposed at the bottom of a powder container 20, wherein the auger and the powder container collectively form a powder distribution mechanism 116. The container 20 is filled with the powder and as the auger 21 turns in response to being driven by the pneumatic rotational motion device 14, the powder from the container 20 falls into a funnel 22 and then becomes loosely distributed into the waste water of the municipal sewer.

Operation of the auger 21, and therefore the periodic distribution of the powder, is determined by the electronic timer 2 periodically opening the solenoid control valve 4 to thereby periodically deliver the pneumatic source 108 to the pneumatic rotational motion device 14.

The general operation of the pneumatic powder feeder system 100 will now be further detailed.

The pneumatically driven powder feeder apparatus 104 is lowered into a municipal sewer 106 at a sewer lift station 106a so to be positioned to treat the waste water of the underground sewage system of the municipality. The pneumatically driven powder feeder apparatus 104 is used inside the sewer because methane gas may build up in the sewer lift station, and since all components are driven via the pneumatic source 108, any possible spark that may cause fire or explosion is eliminated. The container 20 is filled with the powder before lowering into the lift station on a slide unit 110, wherein the slide unit allows for servicing and powder refilling without completely removing the pneumatically driven powder feeder apparatus from the lift station.

The pneumatic source apparatus 102 is placed in a control enclosure 112 at a selected location outside the sewer, generally above the ground, and located close to, but not in, the lift station, wherein the pneumatic feeder line 13 provides the pneumatic source 108 to the pneumatically driven powder feeder apparatus 104. The timer 2 controls the presence of the pneumatic source operably at the pneumatic rotational motion device 14, via the selected state of the solenoid control valve 4. During operation of the pneumatic rotational motion device, typically dispensed is approximately 5 grams of power in one to two seconds, repeated every hour in a twenty four hour period.

The timer is settable for any duration of time and powder size/weight desired for each independent sewer lift station. The pneumatic source 108 is always present in the tank 10, and is immediately available to the pneumatic rotational motion device, per the timer's control of the state of the solenoid control valve 4, and is maintained at a pressure of between about 60 and 80 PSI. In this regard, when timer 2 reaches a specified time, it causes the solenoid control valve 4 to switch to the open state and thereby provide the pneumatic source 108 though the pneumatic feed line 13 to the lubricator 15 and ultimately the pneumatic rotational motion device 14. The pneumatic rotational motion device 14 is thereupon powered by the pneumatic source 108 and turns the sprockets 17 and 18, which thereupon turn the auger 21 so as to dispense a predetermined amount of the powder from the container 20 through the funnel 22 and into the waste water of the sewer for a duration of about one to two seconds. After the one to two seconds and with the powder released, the timer 2 switches the solenoid control valve 4 to the closed state, and switches the solenoid bleeder valve 3 from its normally closed state to the open state so as to release back pressure from the air compressor 1, wherein after a short time the solenoid bleeder valve 3 is switched back to its normally closed state by the timer. The air compressor 1 will restart whenever, for example, the air pressure of the pneumatic source drops below about 60 PSI and will build pressure back to 80 PSI ready for future cycling. The powder release duration (for example one to two seconds) and the powder release periodicity (for example hourly) are set consistent with a particular application.

Accordingly, it is to be understood that the foregoing description provides a method for depositing a powder into waste water of a sewer. By way of example, a pneumatic source apparatus is located externally with respect to the sewer; a powder is placed into a pneumatically driven powder feeder apparatus; the pneumatically driven powder feeder apparatus is located within the sewer; the pneumatic source apparatus is connected with the pneumatically driven powder feeder apparatus; and pneumatic pressure of the pneumatic source apparatus is periodically delivered to the pneumatically driven powder feeder apparatus so as to periodically cause the powder to be delivered by the pneumatically driven powder feeder apparatus into the sewer.

It is to be understood by the disclosure presented hereinabove, that the apparatus and method of the present invention may be practiced with any pressurized fluid, as for example pressurized air source periodically operating a pressurized air rotational motion device (pneumatic) or pressurized liquid periodically operating a pressurized liquid rotational motion device (hydraulic).

Figure 8:
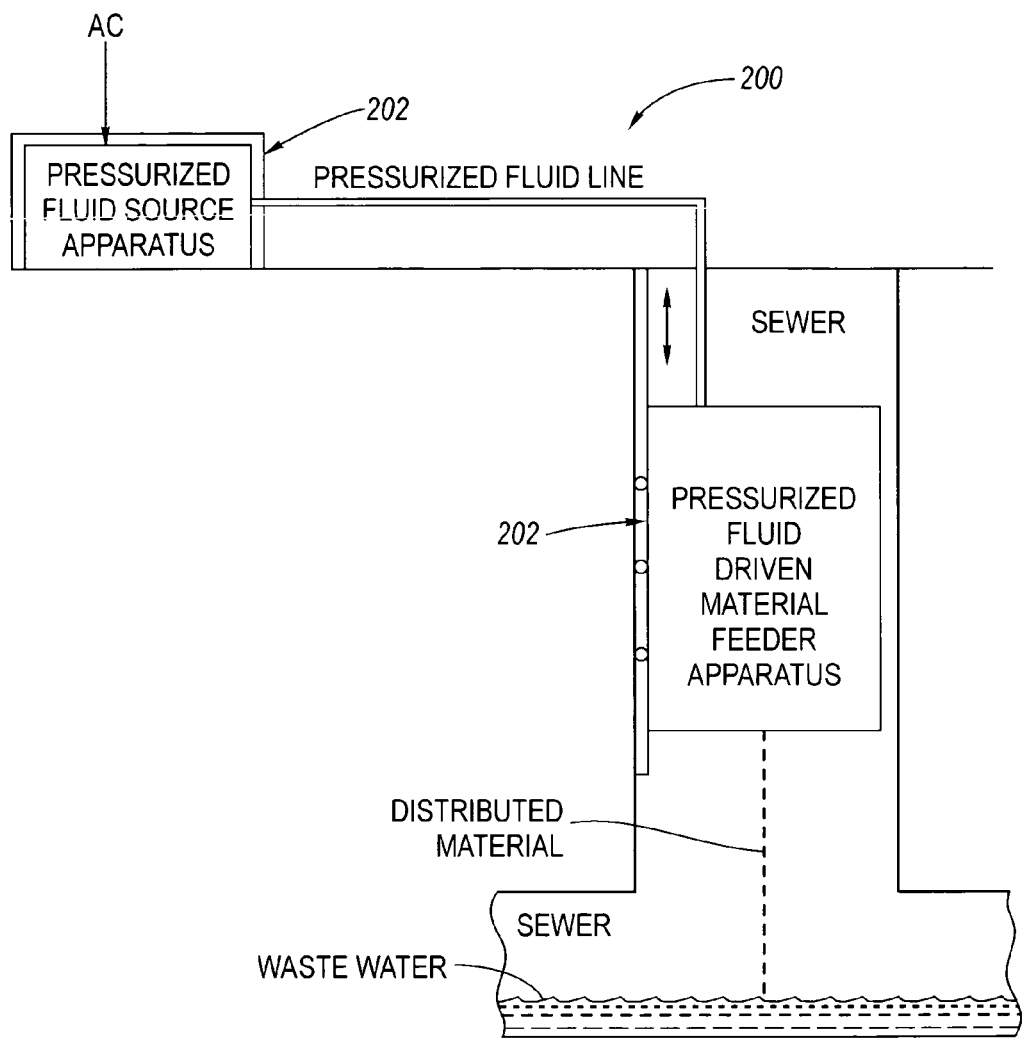
FIG. 8 is a schematic representation of a pressurized fluid material feeder system, generally according to the present invention.

By way of example, in the case of either a pneumatic embodiment or an hydraulic embodiment 200 (see FIG. 8) a pressurized fluid source apparatus 202 is located externally with respect to the sewer; a material (which may or may not be a powder, i.e., for nonlimiting example, a granular, pellet or liquid material) is placed into a pressurized fluid driven material feeder apparatus 204; the pressurized fluid driven material feeder apparatus is placed within the sewer; the pressurized fluid source apparatus is connected with the pressurized fluid driven material feeder apparatus; and fluid pressure of the pressurized fluid source apparatus is periodically delivered to the pressurized fluid driven material feeder apparatus so as to periodically cause the material to be delivered by the pressurized fluid driven material feeder apparatus into the sewer.

Figure 9:
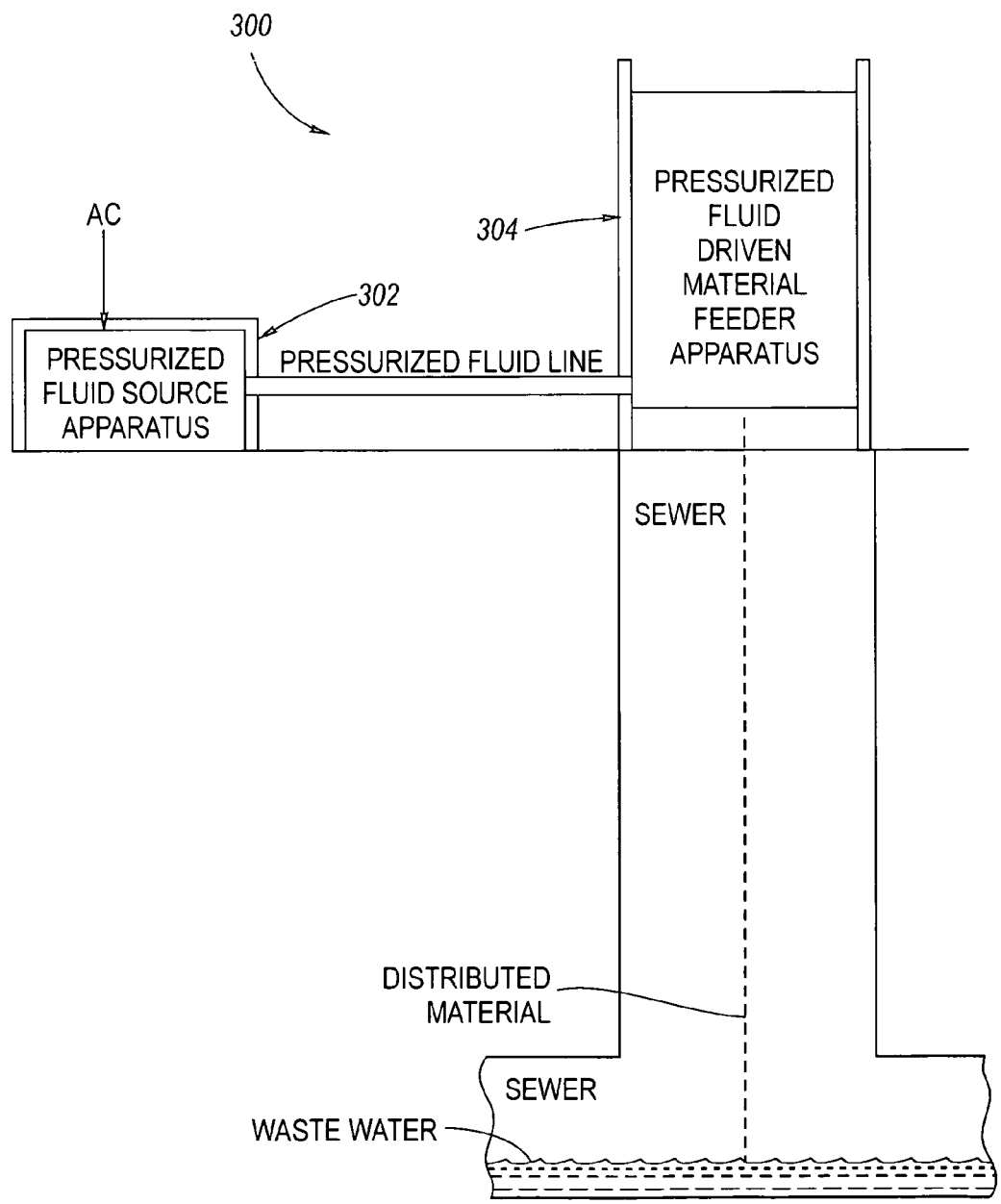
FIG. 9 is a schematic representation of a pressurized fluid material feeder system, generally according to the present invention, wherein the feeder is disposed external to the sewer.

By way of further example, in the case of either a pneumatic embodiment or an hydraulic embodiment 300 (see FIG. 9) in which the pressurized fluid driven material feeder apparatus 304 is disposed all or in part external to the sewer, a pressurized fluid source apparatus 302 is located externally with respect to the sewer; a material (which may or may not be a powder, i.e., for nonlimiting example, a granular, pellet or liquid material) is placed into a pressurized fluid driven material feeder apparatus 304; the pressurized fluid driven material feeder apparatus is located at least in part external the sewer; the pressurized fluid source apparatus is connected with the pressurized fluid driven material feeder apparatus; and fluid pressure of the pressurized fluid source apparatus is periodically delivered to the pressurized fluid driven material feeder apparatus so as to periodically cause the material to be delivered by the pressurized fluid driven material feeder apparatus into the sewer.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. In a sewer environment having gaseous combustibles, a pneumatic powder feeder system for feeding powder to said sewer, comprising:
- means for suppressing combustion comprising:
  - a pneumatic source apparatus disposed outside the sewer, comprising:
    - a pneumatic source;
    - a pneumatic feed line; and
    - a solenoid valve control system regulating delivery of the pneumatic source to said pneumatic feed line; and
  - a pneumatically driven powder feeder apparatus driven by said source disposed within the sewer, comprising:
    - a pneumatic rotational motion device connected to said pneumatic feed line and driven by said pneumatic source responsive to said solenoid control system; and
    - a powder distribution mechanism connected to said pneumatic rotational motion device which mechanically feeds powder to wastewater of the sewer in response to operation of said pneumatic rotational motion device.

2. The pneumatic power feeder system of claim 1, wherein said powder distribution mechanism comprises:
- a powder container adapted for holding a powder; and
- an auger interfaced with said powder container;
- wherein rotation of said auger in response to actuation of said pneumatic rotational motion device causes the powder to be deposited into the waste water of the sewer.

* * * * *